J. & C. CERNY.
VEHICLE WHEEL.
APPLICATION FILED DEC. 5, 1914.
1,139,638.
Patented May 18, 1915.
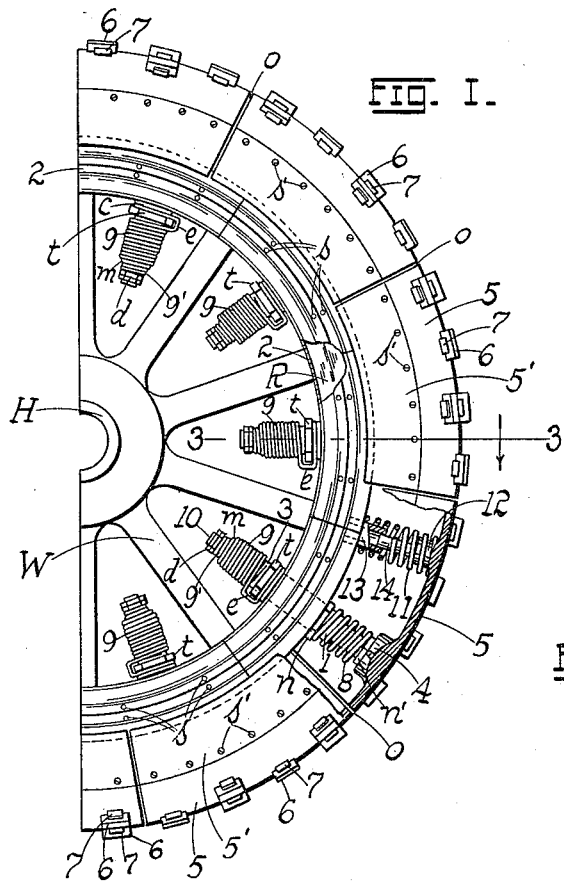
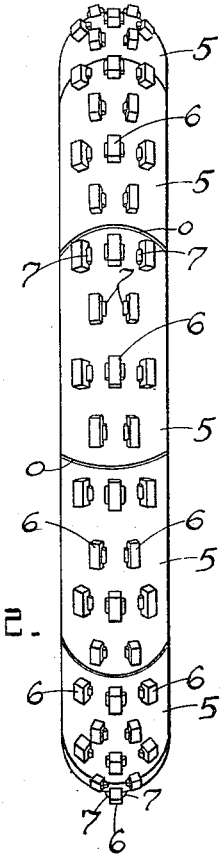
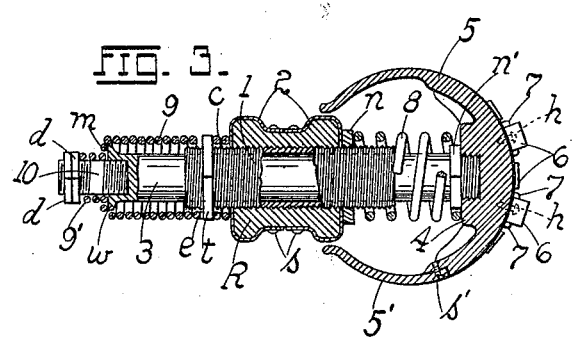
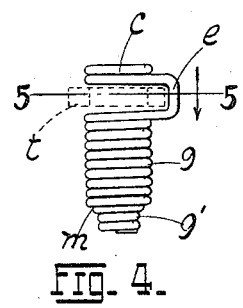
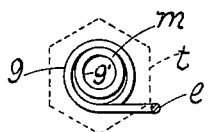
WITNESSES:
Harry A. Bennel
Else M. Siegel
INVENTORS.
Joseph Cerny
Charles Cerny.
BY
ATTORNEY.
THE NORRIS PETERS CO., PHOTO-LITHO., WASHINGTON, D. C.

UNITED STATES PATENT OFFICE.

JOSEPH CERNY AND CHARLES CERNY, OF ST. LOUIS, MISSOURI.

VEHICLE-WHEEL.

1,139,638.  Specification of Letters Patent.  Patented May 18, 1915.

Application filed December 5, 1914. Serial No. 875,689.

*To all whom it may concern:*

Be it known that we, JOSEPH CERNY and CHARLES CERNY, citizens of the United States, residing at St. Louis, State of Missouri, have invented certain new and useful Improvements in Vehicle-Wheels, of which the following is a full, clear, and exact description, reference being had to the accompanying drawings, forming a part hereof.

Our invention has relation to improvements in vehicle wheels; and it consists in the novel features of construction more fully set forth in the specification and pointed out in the claims.

In the drawings, Figure 1 is a side elevation of one-half of a vehicle wheel with our invention applied thereto; Fig. 2 is an edge view of Fig. 1; Fig. 3 is an enlarged cross-section on the line 3—3 of Fig. 1; Fig. 4 is a plan view of the inner tension spring detached; and Fig. 5 is a cross-section on the line 5—5 of Fig. 4.

The object of the present invention is to construct a wheel which will dispense with the prevailing pneumatic puncturable tire, the improvement substituting in lieu thereof a tread portion composed of a series of spring-controlled peripheral sections, each section responding to the pressure imposed thereon by the load supported by it, independently of every other section, the responses of the consecutive sections being not unlike the responses of consecutive portions of a pneumatic tire, but possessing the advantage of being non-puncturable.

A further object is to provide a yielding tread which will be simple in construction, readily applied to a wheel, durable, and one possessing further and other advantages better apparent from a detailed description of the invention, which is as follows:

Referring to the drawings, W represents the spoked portion of an ordinary vehicle wheel, H, the hub, and R the felly of the wheel. Disposed radially through the felly between consecutive spokes is an exteriorly screw-threaded bushing or sleeve 1 which projects beyond the felly inwardly and outwardly, the outer portion carrying a jam nut $n$ bearing against the peripheral face of the felly, or, against the outer section of a metallic sheathing or cover 2 where such sheathing is resorted to. In the present embodiment of our invention the sheathing is of aluminum, the consecutive sections being wrapped about the felly and secured to the inner and outer sides thereof by screws $s$ or their equivalents. Playing loosely through the sleeve 1 and projecting beyond the ends thereof, is a reciprocating stem or tube 3 whose outer screw-threaded terminal is secured to a boss 4 formed on the inner side of a rigid hollow tread member or section 5, contoured cross-sectionally to conform to the prevailing shape of casings of pneumatic tires, the said tread member being preferably composed of two pieces or sections, the smaller one 5' being removable at will and secured to the main section by screws $s'$ as shown. The section 5' does not extend to the tread surface of the section 5, but terminates at the side of the tread member, the purpose of the member 5' being to afford access to the interior of the main section 5 when occasions arise to make repairs or for any other purpose. For our immediate purpose however the two sections 5, 5', are to be considered as a unit and as constituting one of the series of tread sections with which the wheel is provided. The free side edges of the tread section clear the side faces of the felly as shown. To make the tread section anti-skidding the same is preferably provided with rubber teats or knobs 6 secured by screws $h$ and maintained in addition against lateral strain by bounding ribs or lugs 7, 7, the tread sections being preferably made of aluminum or other light material.

Encompassing the outer projecting ends of the sleeve 1 and tube 3 is a compression spring 8 which is confined between the boss 4 and nut $n$ respectively, the outer end of the spring encircling the jam-nut $n'$ carried by the tube 3 and bearing against the free end of the boss 4. Gripped between the inner surface of the felly R and a securing nut $t$ is the outer terminal coil $c$ of an expansion spring 9, said coil being spaced from the main body of the spring sufficiently to receive said nut $t$, the connecting member $e$ between said coil and spring proper clearing the nut so as not to interfere with the free rotation and manipulation of the latter (see Figs. 1, 4, and 5). The inner end of the spring 9 is provided with an inner offset or shoulder $m$ beyond which the spring continues in the form of a reduced extension 9′, said extension being gripped between the inner enlarged terminal or flange $w$ which bears on the shoulder $m$, and the lock nuts $d$, $d$, carried by the projecting end of a bushing or hollow plug 10 screwed, or otherwise driven into the inner end of the tube 3. By the construction as described, one end of the spring 9 is thus anchored between the nut $t$ and the felly, the opposite end being secured to the tube 3. When therefore the tube 3 is driven inward by a load imposed on the tread section 5, the spring 8 is compressed, and the spring 9 expanded, the former spring being under compression, and the latter under tension; and when the load is removed from the tread member (after the wheel has turned sufficiently to cause the particular tread member to pass off the ground) the tube (or reciprocating member) 3 is restored to its outer and normal position by the conjoint action of the springs, the spring 8 expanding and the spring 9 contracting.

In order to distribute the load imposed on a given tread member or section, as uniformly as possible, each section is provided with a supplemental compression spring 11 disposed in line of one of the two consecutive spokes between whose radial extensions the spring 8 is mounted, the outer end of the spring 11 encircling a boss 12 formed on the under side of the tread member 5, and a socket 13 secured to the felly R, the socket member receiving a radial guide stem 14 projecting from the boss 12, the ends of the spring being confined respectively between the felly and tread member as clearly obvious from the drawing. The several tread members are separated by radial spaces $o$ so as to play without friction or rubbing against one another. The number of tread sections circumferentially is not material, but there should be a sufficient number to distribute the load to the best advantage. In the present illustration a given tread section takes in two spokes as clearly apparent from the drawings. The tread members might be applied to wheels having no defined spokes as obvious to those skilled in the art.

The operation may be briefly summarized as follows: As the wheel rotates with the travel of the vehicle of which it forms a part, and assuming the load supported by a wheel is sufficient to compress the springs 8 and 11 as any tread member or section passes over the ground (which of course would always be the bottommost member) the yielding of the springs referred to will cause the stem 3 to be forced inward or upward toward the hub H or rotation axis of the wheel, this movement stretching or expanding the spring 9 whose ends are respectively anchored to the stem (through the medium of the plug 10, shoulder $m$, flange $w$, extension 9′, and lock-nuts $d$, $d$,) and to the felly (by means of the coil $c$ and nut $t$). As soon as any tread member or section has passed off the ground the like action takes place with the next succeeding section passing over the ground, the preceding section as it leaves the ground being caused to assume its normal or outwardly projected position by the recovery of the springs, the compression springs 8 and 11 expanding, whereas the spring 9 contracts, forcing the member 5, now relieved of all load, radially outward. A single section or tread member suffices to bear the load, the circumferential dimensions of the members being proportioned so that the wheel rests on one section at a time.

Obviously the construction shown is susceptible of many modifications not necessary to illustrate, but which will appeal to the skilled mechanic, without affecting either the nature or spirit of our invention.

Having described our invention, what we claim is:

In combination with a vehicle wheel provided with a felly, a tread member disposed exteriorly to the felly and spaced therefrom, a hollow member or sleeve passed radially through the felly and projecting on either side thereof, a stem coupled to the tread member and freely reciprocable through the sleeve and projecting a suitable distance beyond each end of the sleeve, a compression spring coiled about the outer portions of the sleeve and stem and interposed between the felly and the tread member, a second spring coiled about the inner ends of the sleeve and stem and provided with an outer coil terminal spaced from the body of the spring, a nut passed over the inner end of the sleeve and operating to secure the coil terminal to the felly, the connecting member between said coil and body of the spring clearing said nut, the inner end of the spring being provided with an annular offset or shoulder for the support of the inner end of the stem, and provided with a reduced inner terminal beyond said offset, and lock-nuts on the stem for maintaining the shoulder in permanent engagement with the stem terminal, the parts operating substantially as and for the purpose set forth.

In testimony whereof we affix our signatures, in presence of two witnesses.

JOSEPH CERNY.
CHARLES CERNY.

Witnesses:
 EMIL STAREK,
 ELSE M. SIEGEL.